(12) United States Patent
Kim et al.

(10) Patent No.: US 11,427,700 B2
(45) Date of Patent: Aug. 30, 2022

(54) METHOD OF MANUFACTURING RUBBER COMPOSITION

(71) Applicant: Korea Kumho Petrochemical Co., Ltd., Seoul (KR)

(72) Inventors: Jae Yun Kim, Daejeon (KR); Yeong Min Jung, Daejeon (KR); Soojung Park, Seoul (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 506 days.

(21) Appl. No.: 16/517,838

(22) Filed: Jul. 22, 2019

(65) Prior Publication Data

US 2020/0024428 A1    Jan. 23, 2020

(30) Foreign Application Priority Data

Jul. 20, 2018 (KR) ........................ 10-2018-0084557

(51) Int. Cl.
*C08F 136/06* (2006.01)
*C08L 9/00* (2006.01)

(52) U.S. Cl.
CPC .............. *C08L 9/00* (2013.01); *C08F 136/06* (2013.01); *C08L 2205/025* (2013.01)

(58) Field of Classification Search
CPC .... C08F 136/00; C08F 136/04; C08F 136/06; C08F 136/08; C08F 2410/05
See application file for complete search history.

(56) References Cited

U.S. PATENT DOCUMENTS

| | | | |
|---|---|---|---|
| 6,197,888 B1 | 3/2001 | Luo | |
| 2004/0186250 A1* | 9/2004 | Kinnan | ................... C08F 10/00 526/82 |
| 2016/0304707 A1* | 10/2016 | McCauley | ................ C08L 9/00 |

FOREIGN PATENT DOCUMENTS

| | | |
|---|---|---|
| JP | 2003-519263 A | 6/2003 |
| JP | 2004-344347 A | 12/2004 |
| JP | 2006-514132 A | 4/2006 |
| JP | 2012-087321 A | 5/2012 |
| KR | 10-1989-0002925 B1 | 8/1989 |
| KR | 10-2009-0018823 A | 2/2009 |
| KR | 10-2016-0064820 A | 6/2016 |

* cited by examiner

*Primary Examiner* — Irina S Zemel
*Assistant Examiner* — Jeffrey S Lenihan
(74) *Attorney, Agent, or Firm* — Novick, Kim & Lee, PLLC; Jae Youn Kim

(57) ABSTRACT

A method of manufacturing a rubber composition is provided. The method includes: (a) allowing a mixture including a conjugated diene-based monomer to react in the presence of a first catalyst; (b) introducing a carboxylic acid-based compound into the product of the step (a) to deactivate the first catalyst; and (c) introducing a second catalyst and a conjugated diene-based monomer into the product of the step (b) and allowing the second catalyst and the conjugated diene-based monomer to react with the product of the step (b).

8 Claims, 1 Drawing Sheet

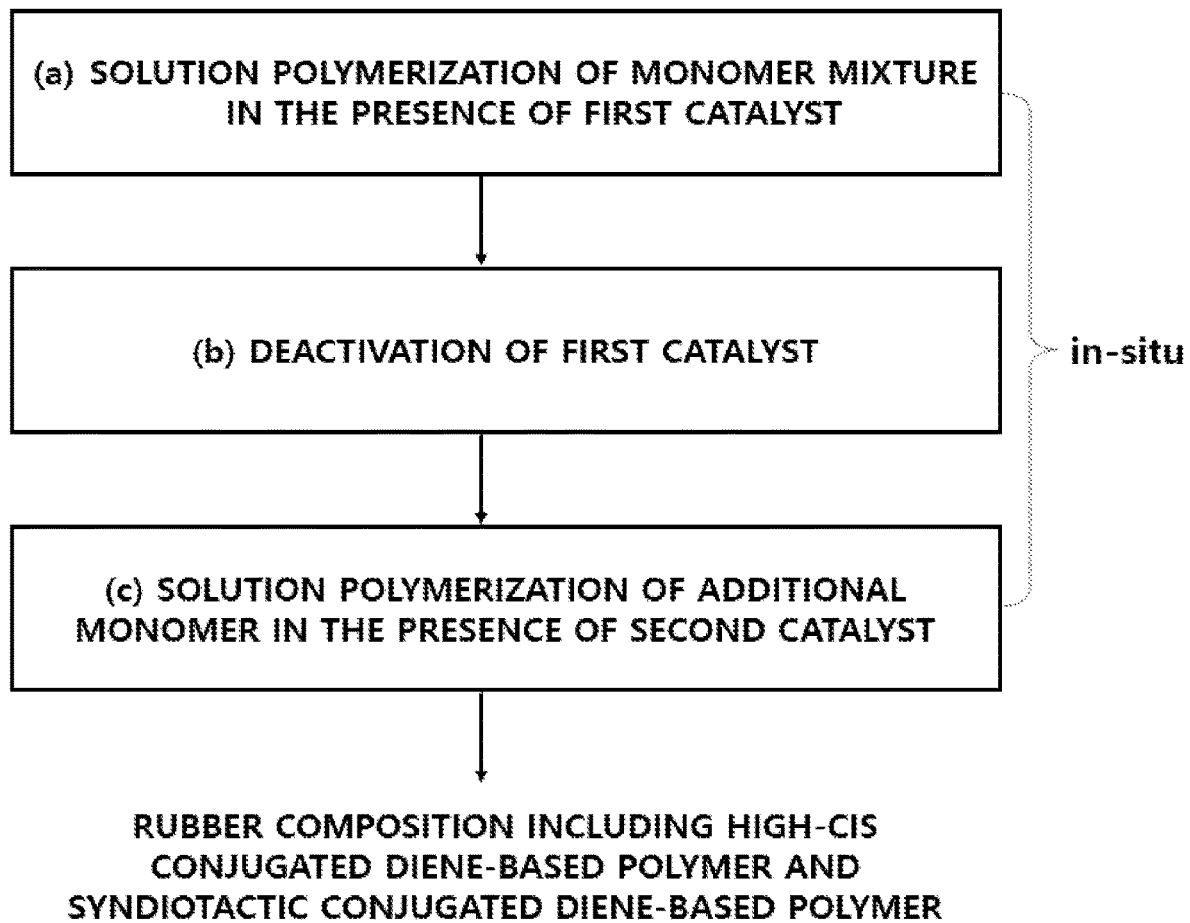

METHOD OF MANUFACTURING RUBBER COMPOSITION

CROSS-REFERENCE TO RELATED APPLICATION

This application claims priority to and the benefit of Korean Patent Application No. 2018-0084557, filed Jul. 20, 2018, the disclosure of which is incorporated herein by reference in its entirety.

BACKGROUND

1. Field of the Invention

The present invention relates to a method of manufacturing a rubber composition, and more particularly, to a method of manufacturing a rubber composition including a high-cis conjugated diene-based polymer and a syndiotactic conjugated diene-based polymer.

2. Discussion of Related Art

A syndiotactic conjugated diene-based polymer is a crystalline polymer having a stereoregular structure in which vinyl groups of the side chain are positioned alternately on two opposite sides of the main chain of a polymer. Because the syndiotactic conjugated diene-based polymer is a unique material that exhibits both properties of plastics and rubbers, the syndiotactic conjugated diene-based polymer is applicable in various fields. For example, the syndiotactic conjugated diene-based polymer may be used to manufacture films, fibers, and various molded articles, and may also be used in combination with a natural or synthetic rubber.

It is widely known that, when a rubber and a crystalline polymer are combined to form a blend, the properties of the blend may be improved. For example, when the syndiotactic conjugated diene-based polymer is combined with a rubber composition for tire treads, tires having excellent strength may be manufactured even when a content of carbon black generally used to improve the strength of the tires is lowered. The syndiotactic conjugated diene-based polymer generates a smaller amount of heat than the carbon black, and participates in vulcanization to lower hysteresis loss and rolling resistance, thereby improving fuel efficiency of the tires. Also, the syndiotactic conjugated diene-based polymer may be readily used to manufacture lightweight tires due to its low specific gravity.

The blend of the crystalline polymer and the rubber is prepared using a conventional mixing device such as a mixer, an extruder, or a kneader. In this case, however, there are problems of increased costs, degraded and cross-linked polymers, inappropriate mixing, and degraded processability. In particular, the degradation and crosslinking of polymers, which are caused due to the high vinyl content of the syndiotactic conjugated diene-based polymer, may hinder the high-temperature mixing of the syndiotactic conjugated diene-based polymer and a rubber.

A method of manufacturing a blend of a crystalline polymer and a rubber by polymerizing a high-cis polymer and a syndiotactic conjugated diene-based polymer separately and mixing the resulting polymerization products in a solution state has been proposed, but has limitations in terms of mutual dispersibility. When the syndiotactic conjugated diene-based polymer is polymerized in the presence of a hydrocarbon solvent, process fouling may be caused due to leaching.

A method of polymerizing a syndiotactic conjugated diene-based polymer in the presence of a solution in which a high-cis polymer is dissolved has been proposed, but has a drawback in that a polymerization reaction of the syndiotactic conjugated diene-based polymer does not occur due to the presence of a catalyst for polymerization of high-cis 1,4-polybutadiene whose activities are still alive even when high-cis 1,4-polybutadiene is polymerized, followed by continuous polymerization of the syndiotactic conjugated diene-based polymer.

U.S. Pat. No. 6,197,888 discloses the possibility of using a phosphorus-based compound such as bis(2-ethylhexyl) hydrogen phosphite as a polymerization terminator for high-cis 1,4-polybutadiene, but the phosphorus-based compound has a drawback in that it is impossible to obtain a high-yield syndiotactic conjugated diene-based polymer when the phosphorus-based compound is used in a substantial polymerization reaction.

PRIOR-ART DOCUMENT Patent Document
Patent Document 1: U.S. Pat. No. 6,197,888 B1

SUMMARY OF THE INVENTION

The present invention is designed to solve the problems of the prior art, and therefore it is an object of the present invention to provide a method of manufacturing a rubber composition in which a high-yield syndiotactic conjugated diene-based polymer is dispersed in a high-cis conjugated diene-based polymer in an in-situ manner using a continuous process.

According to one aspect of the present invention, there is provided a method of manufacturing a rubber composition, which includes (a) allowing a mixture including a conjugated diene-based monomer to react in the presence of a first catalyst; (b) introducing a carboxylic acid-based compound into the product of the step (a) to deactivate the first catalyst; and (c) introducing a second catalyst and a conjugated diene-based monomer into the product of the step (b) and allowing the second catalyst and the conjugated diene-based monomer to react with the product of the step (b).

According to one exemplary embodiment, the carboxylic acid-based compound may be represented by Formula 1 below:

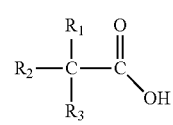

[Formula 1]

wherein each of $R_1$ and $R_2$ may be a $C_1$ to $C_{20}$ alkyl group or an aryl group, and $R_3$ may be a $C_1$ to $C_{20}$ alkyl group, an aryl group, or hydrogen.

According to one exemplary embodiment, the conjugated diene-based monomer may include one selected from the group consisting of 1,3-butadiene, 2,3-dimethyl-1,3-butadiene, piperylene, 3-butyl-1,3-octadiene, isoprene, 2-phenyl-1,3-butadiene, and a combination of two or more types thereof.

According to one exemplary embodiment, the first catalyst may include a lanthanide complex compound, an organoaluminum chloride compound, and an organoaluminum compound.

According to one exemplary embodiment, the organoaluminum chloride compound may include one selected from the group consisting of diethyl aluminum chloride, dimethyl aluminum chloride, dipropyl aluminum chloride, diisobutyl aluminum chloride, dihexyl aluminum chloride, dioctyl aluminum chloride, ethyl aluminum dichloride, methyl aluminum dichloride, propyl aluminum dichloride, isobutyl aluminum dichloride, hexyl aluminum dichloride, octyl aluminum dichloride, ethyl aluminum sesquichloride, methyl aluminum sesquichloride, propyl aluminum sesquichloride, isobutyl aluminum sesquichloride, hexyl aluminum sesquichloride, octyl aluminum sesquichloride, and a combination of two or more types thereof, and the organoaluminum compound may include one selected from the group consisting of trimethyl aluminum, triethyl aluminum, tripropyl aluminum, tributyl aluminum, triisobutyl aluminum, trihexyl aluminum, diethyl aluminum chloride, diisobutyl aluminum hydride, and a combination of two or more types thereof.

According to one exemplary embodiment, the second catalyst may include a transition metal complex compound, a phosphorus-based compound, and a trialkyl aluminum compound.

According to one exemplary embodiment, the phosphorus-based compound may be a phosphite, a phosphate, or a mixture thereof.

According to one exemplary embodiment, at least a portion of the complex ions of the transition metal complex compound may be identical to the carboxylic acid-based compound.

According to one exemplary embodiment, in the step (b), a molar ratio of the first catalyst and the carboxylic acid-based compound may be in a range of 1:0.5 to 1.5.

According to one exemplary embodiment, the steps (a) to (c) may be carried out in an in-situ manner.

According to one exemplary embodiment, the product of the step (c) may have a melting point peak at 160 to 175° C., and a heat of fusion of the product at the melting point peak may be greater than or equal to 1.0 J/g.

According to one exemplary embodiment, the rubber composition may include 60 to 90% by weight of a high-cis conjugated diene-based polymer and 10 to 40% by weight of a syndiotactic conjugated diene-based polymer.

BRIEF DESCRIPTION OF THE DRAWING

The above and other objects, features and advantages of the present invention will become more apparent to those of ordinary skill in the art by describing in detail exemplary embodiments thereof with reference to the attached drawing, in which:

The FIGURE is a diagram schematically showing a method of manufacturing a rubber composition according to one aspect of the present invention.

DETAILED DESCRIPTION OF EXEMPLARY EMBODIMENTS

Hereinafter, exemplary embodiments of the present invention will be described in detail with reference to the accompanying drawings. However, it should be understood that the present invention can be implemented in various forms, and that it is not intended to limit the present invention to the exemplary embodiments. Also, in the drawings, descriptions of parts unrelated to the detailed description are omitted to clearly describe the present invention. Throughout the specification, like numbers refer to like elements.

Throughout the specification, a certain part being "connected" to another part means that the certain part is "directly connected" to the other part or that the certain part is "indirectly connected" to the other part through another member interposed between the two parts. Also, a certain part "including" a certain element signifies that the certain part may further include, instead of excluding, another element unless particularly indicated otherwise.

Hereinafter, exemplary embodiments of the present invention will be described in detail with reference to the accompanying drawings.

The FIGURE is a diagram schematically showing a method of manufacturing a rubber composition according to one aspect of the present invention.

Referring to the FIGURE, the method of manufacturing a rubber composition according to one aspect of the present invention may include: (a) allowing a mixture including a conjugated diene-based monomer to react in the presence of a first catalyst; (b) introducing a carboxylic acid-based compound into the product of the step (a) to deactivate the first catalyst; and (c) introducing a second catalyst and a conjugated diene-based monomer into the product of the step (b) and allowing the second catalyst and the conjugated diene-based monomer to react with the product of the step (b).

The carboxylic acid-based compound refers to a compound containing one or more carboxylic acid groups (—COOH) in the molecular structure thereof, and may, for example, be represented by Formula 1 below:

[Formula 1]

Wherein each of $R_1$ and $R_2$ may be a $C_1$ to $C_{20}$ alkyl group or an aryl group, and $R_3$ may be a $C_1$ to $C_{20}$ alkyl group, an aryl group, or hydrogen.

In the step (a), a monomer mixture including the conjugated diene-based monomer may be solution-polymerized in the presence of the first catalyst to polymerize a high-cis conjugated diene-based polymer The solution polymerization is a method of polymerizing and/or copolymerizing one or more monomers in the presence of a catalyst using a certain type of solvent as a polymerization medium. The solvent may, for example, be one selected from the group consisting of an aliphatic hydrocarbon-based solvent, a cyclic aliphatic hydrocarbon-based solvent, an aromatic hydrocarbon-based solvent, and a mixture of two or more types thereof, preferably one selected from the group consisting of n-pentane, n-hexane, n-heptane, isooctane, cyclohexane, toluene, benzene, xylene, and a combination of two or more types thereof, and more preferably, n-heptane, but the present invention is not limited thereto.

The conjugated diene-based monomer may be one selected from the group consisting of 1,3-butadiene, 2,3-dimethyl-1,3-butadiene, piperylene, 3-butyl-1,3-octadiene, isoprene, 2-phenyl-1,3-butadiene, and a combination of two or more types thereof, and preferably 1,3-butadiene, but the present invention is not limited thereto. When the conjugated diene-based monomer is 1,3-butadiene, the high-cis conjugated diene-based polymer may be high-cis 1,4-polybutadiene.

In the step (a), an initiation temperature of a polymerization reaction may be in a range of approximately 0 to 80° C., and preferably approximately 20 to 70° C. during the solution polymerization. When the initiation temperature is less than 0° C., the viscosity of the solution may rise dramatically during the polymerization reaction, thereby resulting in a decreased reaction rate, which is economically disadvantageous. On the other hand, when the initiation temperature is greater than 80° C., it may be difficult to control a reaction temperature. Also, a reaction pressure may be in a range of 1 to 10 kgf/cm$^2$. The solution polymerization may be performed for a sufficient time until all the monomers are converted into polymers or copolymers, that is, for 20 to 200 minutes until a desired conversion rate is achieved.

The term "complex compound" refers to a compound formed by coordinate linkage between a central metal element and ligands. The complex compound may have different effects when the complex compound has different ligands although the complex compound has the same central metal element. On the other hand, the complex compound may have heterogeneous effects when the complex compound has a different central metal element although the complex compound has the same ligands.

The first catalyst may include a lanthanide complex compound, an organoaluminum chloride compound, and an organoaluminum compound. The first catalyst may be a catalyst system obtained by mixing a lanthanide complex compound, a conjugated diene-based monomer, an organoaluminum chloride compound, and an organoaluminum compound at a predetermined molar ratio, for example, at a molar ratio of 1:5 to 30:1 to 10:20 to 80 and aging the resulting mixture under certain conditions.

The solvent used to prepare the catalyst system is not particularly limited, and may be a non-polar solvent having no reactivity with the catalyst, an aliphatic hydrocarbon, a cycloaliphatic hydrocarbon, benzene, ethylbenzene, toluene, xylene, and the like. For example, the solvent may include one selected from the group consisting of pentane, hexane, isopentane, heptane, octane, isooctane, cyclopentane, methylcyclopentane, cyclohexane, methylcyclohexane, ethylcyclohexane, and a combination of two or more types thereof.

The lanthanide complex compound may, for example, be a neodymium salt complex compound. An example of the neodymium salt complex compound that may be used in the present invention may be one selected from the group consisting of neodymium hexanoate, neodymium heptanoate, neodymium octanoate, neodymium octoate, neodymium naphthenate, neodymium stearate, neodymium versatate, neodymium bis(2-ethylhexyl) phosphate, neodymium bis(1-methylheptyl) phosphate, neodymium (mono-2-ethylhexyl-2-ethylhexyl) phosphonate, neodymium bis(2-ethylhexyl) phosphite, and a combination of two or more types thereof, and preferably neodymium versatate, but the present invention is not limited thereto.

The organoaluminum chloride compound may include one selected from the group consisting of diethyl aluminum chloride, dimethyl aluminum chloride, dipropyl aluminum chloride, diisobutyl aluminum chloride, dihexyl aluminum chloride, dioctyl aluminum chloride, ethyl aluminum dichloride, methyl aluminum dichloride, propyl aluminum dichloride, isobutyl aluminum dichloride, hexyl aluminum dichloride, octyl aluminum dichloride, ethyl aluminum sesquichloride, methyl aluminum sesquichloride, propyl aluminum sesquichloride, isobutyl aluminum sesquichloride, hexyl aluminum sesquichloride, octyl aluminum sesquichloride, and a combination of two or more types thereof, but the present invention is not limited thereto.

The organoaluminum compound may include one selected from the group consisting of trimethyl aluminum, triethyl aluminum, tripropyl aluminum, tributyl aluminum, triisobutyl aluminum, trihexyl aluminum, trioctyl aluminum and diisobutyl aluminum hydride, dimethyl aluminum hydride, diethyl aluminum hydride, dipropyl aluminum hydride, dibutyl aluminum hydride, diisobutyl aluminum hydride, dihexyl aluminum hydride, dioctyl aluminum hydride, and a combination of two or more types thereof, but the present invention is not limited thereto.

The second catalyst may include a transition metal complex compound, a phosphorus-based compound, and a trialkyl aluminum compound.

The transition metal complex compound may be an iron carboxylate or an iron acetylacetonate. The iron carboxylate may, for example, be one selected from the group consisting of iron (II) formate, iron (III) formate, iron (II) acetate, iron (III) acetate, iron (II) acrylate, iron (III) acrylate, iron (II) methacrylate, iron (III) methacrylate, iron (II) valerate, iron (III) valerate, iron (II) gluconate, iron (III) gluconate, iron (II) citrate, iron (III) citrate, iron (II) fumarate, iron (III) fumarate, iron (II) lactate, iron (III) lactate, iron (II) malate, iron (III) malate, iron (II) oxalate, iron (III) oxalate, iron (II) 2-ethylhexanoate, iron (III) 2-ethylhexanoate, iron (II) neodecanoate, iron (III) neodecanoate, iron (II) stearate, iron (III) stearate, iron (II) oleate, iron (III) oleate, iron (II) benzoate, iron (III) benzoate, iron (II) picolinate, iron (III) picolinate, and a combination of two or more types thereof, but the present invention is not limited thereto.

At least a portion of the complex ions of the transition metal complex compound may be identical to the carboxylic acid-based compound. When the complex ion is identical to the carboxylic acid-based compound, the carboxylic acid-based compound may serve as a polymerization terminator which deactivates the first catalyst, and also improve the activity of the second catalyst to facilitate generation of the syndiotactic conjugated diene-based polymer. For example, when the transition metal complex compound is iron (III) 2-ethylhexanoate, the carboxylic acid-based compound may be a 2-ethylhexyl acid.

The phosphorus-based compound may be a phosphite, a phosphate, or a mixture thereof. The phosphite may, for example, be one selected from the group consisting of hydrogen diisopropyl phosphite, hydrogen diisobutyl phosphite, hydrogen dihexyl phosphite, hydrogen dioctyl phosphite, hydrogen dinonyl phosphite, hydrogen dicyclohexyl phosphite, triisopropyl phosphite, diisopropyloctyl phosphite, diisopropylnonyl phosphite, diisopropyldodecyl phosphite, dibutyloctyl phosphite, dibutylcyclohexyl phosphite, dibutylnonyl phosphite, dibutyldodecyl phosphite, tributyl phosphite, triisobutyl phosphite, trihexyl phosphite, trioctyl phosphite, bis(2-ethylhexyl) phosphite, and a combination of two or more types thereof, but the present invention is not limited thereto. Also, the phosphate may, for example, be one selected from the group consisting of triphenyl phosphate, ethyl diphenyl phosphate, diethyl phenyl phosphate, triethyl phosphate, and a combination of two or more types thereof, but the present invention is not limited thereto.

The second catalyst may include 1 to 15 equivalents of the phosphorus-based compound and 15 to 40 equivalents of the organoaluminum compound with respect to one equivalent of the transition metal complex compound. When the components and composition ratio of the second catalyst fall out of these ranges, the properties of the syndiotactic conjugated diene-based polymer may not be realized at a desired level.

The carboxylic acid-based compound may, for example, be one selected from the group consisting of 2-methylpropanoic acid, 2-methylbutanoic acid, 2-methylpentanoic acid, 2-methylhexanoic acid, 2-methylheptanoic acid, 2-methyloctanoic acid, 2-methylnonanoic acid, 2-methyldecanoic acid, 2-ethylbutanoic acid, 2-ethylpentanoic acid, 2-ethylhexanoic acid, 2-ethylheptanoic acid, 2-ethyloctanoic acid, 2-ethylnonanoic acid, 2-ethyldecanoic acid, 2-propylpentanoic acid, 2-propylhexanoic acid, 2-propylheptanoic acid, 2-propyloctanoic acid, 2-propylnonanoic acid, 2-propyldecanoic acid, 2-butylhexanoic acid, 2-butylheptanoic acid, 2-butyloctanoic acid, 2-butylnonanoic acid, 2-butyldecanoic acid, 2-pentylheptanoic acid, 2-pentyloctanoic acid, 2-pentylnonanoic acid, 2-pentyldecanoic acid, 2-hexyloctanoic acid, 2-hexylnonanoic acid, 2-hexyldecanoic acid, 2-heptylnonanoic acid, 2-heptyldecanoic acid, 2-octyldecanoic acid, 2-phenylpropanoic acid, 2-phenylbutanoic acid, 2-phenylpentanoic acid, 2-phenylhexanoic acid, 2-phenylheptanoic acid, 2-phenyloctanoic acid, 2-phenylnonanoic acid, 2-phenyldecanoic acid, 2-benzylpropanoic acid, 2-methyl-3-phenylbutanoic acid, 2-methyl-3-phenylpentanoic acid, 2-methyl-3-phenylhexanoic acid, 2-methyl-3-phenylheptanoic acid, 2-methyl-3-phenyloctanoic acid, 2-methyl-3-phenylnonanoic acid, 2-methyl-3-phenyldecanoic acid, 2-methyl-4-phenylbutanoic acid, 2-ethyl-4-phenylbutanoic acid, 2-(2-phenylethyl)pentanoic acid, 2-(2-phenylethyl)hexanoic acid, 2-(2-phenylethyl)heptanoic acid, 2-(2-phenylethyl)octanoic acid, 2-(2-phenylethyl)nonanoic acid, 2-(2-phenylethyl)decanoic acid, and a combination of two or more types thereof, but the present invention is not limited thereto.

The carboxylic acid-based compound may serve as a polymerization terminator that deactivates the first catalyst and a polymerization accelerator that improves the reactivity of the second catalyst. According to the prior art, it is known that an alcohol-based, carboxylic acid-based, or phosphorus-based compound may also be used as the polymerization terminator. However, the use of the carboxylic acid-based compound of the present invention may result in a further improved reaction yield and rate at which the syndiotactic conjugated diene-based polymer is polymerized.

In the step (b), a molar ratio of the first catalyst and the carboxylic acid-based compound may be in a range of 1:0.5 to 1.5. When the molar ratio of the carboxylic acid-based compound is less than 0.5, polymerization of the syndiotactic conjugated diene-based polymer may be inhibited due to the activity of the first catalyst. On the other hand, when the molar ratio of the carboxylic acid-based compound is greater than 1.5, the carboxylic acid-based compound may be unnecessarily consumed.

The steps (a) to (c) may be performed in an in-situ manner using a continuous process. In particular, when the high-cis conjugated diene-based polymer and the syndiotactic conjugated diene-based polymer are polymerized in an in-situ manner without using the step (b), process stability may be degraded due to the reactivity of the first catalyst, resulting in decreased yield of the syndiotactic conjugated diene-based polymer. Also, when the high-cis conjugated diene-based polymer and the syndiotactic conjugated diene-based polymer are synthesized separately and then mixed, the manufactured rubber composition may have poor dispersibility.

The product of the step (c) may have a melting point peak at 160 to 175° C., and preferably 167 to 170° C., and a heat of fusion of the product at the melting point may be greater than or equal to 1.0 J/g, preferably greater than or equal to 3.0 J/g, and more preferably greater than or equal to 8.0 J/g. The upper limit of the heat of fusion is not defined, but may be less than or equal to 15.0 J/g, 12.0 J/g, or 9.0 J/g. A content of the produced syndiotactic conjugated diene-based polymer may be determined from the melting point peak and the heat of fusion. The method of manufacturing a rubber composition according to the present invention may enable polymerization of the high-yield syndiotactic conjugated diene-based polymer, thereby enhancing the heat of fusion of the manufactured rubber composition.

The product of the step (c) may be the syndiotactic conjugated diene-based polymer. In this case, the polymer may be present in a state in which the polymer is dispersed in the product of the step (a).

The rubber composition may include 60 to 90% by weight of the high-cis conjugated diene-based polymer and 10 to 40% by weight of the syndiotactic conjugated diene-based polymer. Because the rubber composition has a high content of the syndiotactic conjugated diene-based polymer, the rubber composition may be applied to manufacture tires having high strength. Also, the syndiotactic conjugated diene-based polymer is a crystalline organic filler that may have a strength reinforcing effect similar to that of carbon black conventionally used to manufacture tires. When the syndiotactic conjugated diene-based polymer is used in combination with carbon black, the syndiotactic conjugated diene-based polymer may reduce the generation of heat, and may participate in vulcanization to lower hysteresis loss and rolling resistance, thereby improving fuel efficiency of the tires Hereinafter, examples of the present invention will be described in further detail. However, it should be understood that the following experimental results are merely given for the purpose of describing the representative experimental results in the examples, and are not intended to define and limit the scope and spirit of the present invention. For other various embodiments of the present invention not explicitly described herein, the respective effects will be specifically described in the corresponding sections.

The following experimental results show that the content of syndiotactic 1,2-polybutadiene in the rubber composition manufactured according to one exemplary embodiment of the present invention, and the physical properties of the composition are analyzed by comparison with those of rubber compositions manufactured using conventional methods of manufacturing a rubber composition.

Example 1

100 mL of heptane, 75 mg of neodymium versatate, 90 mg of diethyl aluminum chloride, 660 mg of diisobutyl aluminum hydride, 620 mg of triisobutyl aluminum, and 140 mg of 1,3-butadiene were mixed to prepare a first catalyst.

2.45 g of bis(2-ethylhexyl) phosphite, 0.48 g of iron (III) 2-ethylhexanoate, and n-heptane were mixed in a separate container to prepare a second catalyst.

3,700 g of heptane was added into a 10 L reactor purged with nitrogen, and then an inner temperature of the reactor was adjusted to 70° C. while stirring. When the inner temperature of the reactor reached 70° C., the first catalyst and 400 g of 1,3-butadiene were added thereto, and a polymerization reaction was performed. When the polymerization was completed, 1.25 g of 2-ethylhexanoic acid was added thereto, and stirred for an hour to prepare a first solution including high-cis 1,4-polybutadiene.

The second catalyst was added into the reactor, and mixed with the first solution. Thereafter, 6.35 g of triisobutyl aluminum was added into the reactor, and an inner temperature of the reactor was adjusted to 70° C. When the inner temperature of the reactor reached 70° C., 133 g of 1,3-butadiene was further added thereto, and a polymerization reaction was performed for 3 hours to prepare a second solution including high-cis 1,4-polybutadiene and syndiotactic 1,2-polybutadiene.

2.2 g of dibutyl hydroxytoluene was added to the second solution, and the resulting solution was dried with steam to remove heptane, and then roll-dried to manufacture a rubber composition in which syndiotactic 1,2-polybutadiene was dispersed in a matrix including high-cis 1,4-polybutadiene.

It was confirmed that the syndiotactic 1,2-polybutadiene in the manufactured rubber composition had a melting point of 170° C. and a heat of fusion of 8.7 J/g, as determined using a differential scanning calorimeter (DSC).

Example 2

A rubber composition in which syndiotactic 1,2-polybutadiene was dispersed in a matrix including high-cis 1,4-polybutadiene was manufactured in the same manner as in Example 1, except that the amount of 2-ethylhexanoic acid added in Example 1 was changed to 1.875 g.

It was confirmed that the syndiotactic 1,2-polybutadiene in the manufactured rubber composition had a melting point of 168° C. and a heat of fusion of 8.3 J/g, as determined using a differential scanning calorimeter.

Example 3

A rubber composition in which syndiotactic 1,2-polybutadiene was dispersed in a matrix including high-cis 1,4-polybutadiene was manufactured in the same manner as in Example 1, except that the amount of 2-ethylhexanoic acid added in Example 1 was changed to 0.75 g.

It was confirmed that the syndiotactic 1,2-polybutadiene in the manufactured rubber composition had a melting point of 167° C. and a heat of fusion of 8.2 J/g, as determined using a differential scanning calorimeter.

Comparative Example 1

100 mL of heptane, 75 mg of neodymium versatate, 90 mg of diethyl aluminum chloride, 660 mg of diisobutyl aluminum hydride, 620 mg of triisobutyl aluminum, and 140 mg of 1,3-butadiene were mixed to prepare a first catalyst.

2.45 g of bis(2-ethylhexyl) phosphite, 0.48 g of iron (III) 2-ethylhexanoate, and n-heptane were mixed in a separate container to prepare a second catalyst.

3,700 g of heptane was added into a 10 L reactor purged with nitrogen, and then an inner temperature of the reactor was adjusted to 70° C. while stirring. When the inner temperature of the reactor reached 70° C., the first catalyst and 400 g of 1,3-butadiene were added thereto, and a polymerization reaction was performed to prepare a first solution including high-cis 1,4-polybutadiene.

The second catalyst was added into the reactor, and mixed with the first solution.

Thereafter, 6.35 g of triisobutyl aluminum was added into the reactor, and an inner temperature of the reactor was adjusted to 70° C. When the inner temperature of the reactor reached 70° C., 133 g of 1,3-butadiene was further added thereto, and a polymerization reaction was performed for 3 hours to prepare a second solution.

2.2 g of dibutyl hydroxytoluene was added to the second solution, and the resulting solution was dried with steam to remove heptane, and then roll-dried to manufacture a rubber composition.

The manufactured rubber composition was analyzed using a differential scanning calorimeter. As a result, it was confirmed that the melting point and the heat of fusion of the syndiotactic 1,2-polybutadiene were not determined.

Comparative Example 2

100 mL of heptane, 75 mg of neodymium versatate, 90 mg of diethyl aluminum chloride, 660 mg of diisobutyl aluminum hydride, 620 mg of triisobutyl aluminum, and 140 mg of 1,3-butadiene were mixed to prepare a first catalyst.

2.45 g of bis(2-ethylhexyl) phosphite, 0.48 g of iron (III) 2-ethylhexanoate, and n-heptane were mixed in a separate container to prepare a second catalyst.

3,700 g of heptane was added into a 10 L reactor purged with nitrogen, and then an inner temperature of the reactor was adjusted to 70° C. while stirring. When the inner temperature of the reactor reached 70° C., the first catalyst and 400 g of 1,3-butadiene were added thereto, and a polymerization reaction was performed to prepare a first solution including high-cis 1,4-polybutadiene.

1.91 g of dibutyl hydroxytoluene was added to the first solution, and stirred for an hour. The second catalyst was added into the reactor, and mixed with the first solution. Thereafter, 6.35 g of triisobutyl aluminum was added thereto, and an inner temperature of the reactor was adjusted to 70° C. When the inner temperature of the reactor reached 70° C., 133 g of 1,3-butadiene was further added thereto, and a polymerization reaction was then performed for 3 hours to prepare a second solution.

2.2 g of dibutyl hydroxytoluene was added to the second solution, and the resulting solution was dried with steam to remove heptane, and then roll-dried to manufacture a rubber composition.

The manufactured rubber composition was analyzed using a differential scanning calorimeter. As a result, it was confirmed that the syndiotactic 1,2-polybutadiene had a melting point of 163° C. and a heat of fusion of 1.5 J/g.

Comparative Example 3

100 mL of heptane, 75 mg of neodymium versatate, 90 mg of diethyl aluminum chloride, 660 mg of diisobutyl aluminum hydride, 620 mg of triisobutyl aluminum, and 140 mg of 1,3-butadiene were mixed to prepare a first catalyst.

2.45 g of bis(2-ethylhexyl) phosphite, 0.48 g of iron (III) 2-ethylhexanoate, and n-heptane were mixed in a separate container to prepare a second catalyst.

3,700 g of heptane was fed into a 10 L reactor purged with nitrogen, and then an inner temperature of the reactor was adjusted to 70° C. while stirring. When the inner temperature of the reactor reached 70° C., the first catalyst and 400 g of 1,3-butadiene were added thereto, and a polymerization reaction was performed to prepare a first solution including high-cis 1,4-polybutadiene.

2.66 g of bis(2-ethylhexyl) phosphite was added to the first solution, and stirred for an hour. The second catalyst was added into the reactor, and mixed with the first solution. Thereafter, 6.35 g of triisobutyl aluminum was added thereto, and an inner temperature of the reactor was adjusted to 70° C. When the inner temperature of the reactor reached 70° C., 133 g of 1,3-butadiene was further added thereto, and a polymerization reaction was then performed for 3 hours to prepare a second solution including high-cis 1,4-polybutadiene and syndiotactic 1,2-polybutadiene.

2.2 g of dibutyl hydroxytoluene was added to the second solution, and the resulting solution was dried with steam to remove heptane, and then roll-dried to manufacture a rubber composition in which syndiotactic 1,2-polybutadiene was dispersed in a matrix including high-cis 1,4-polybutadiene.

It was confirmed that the syndiotactic 1,2-polybutadiene in the manufactured rubber composition had a melting point of 165° C. and a heat of fusion of 2.1 J/g, as determined using a differential scanning calorimeter.

Preparation Examples and Comparative Preparation Examples

Each of the rubber compositions according to Examples 1 to 3 and Comparative Examples 1 to 3, natural rubber, carbon black, zinc oxide, stearic acid, an antioxidant, sulfur, and a vulcanization accelerator were mixed, and stirred to prepare a blend. The blends including the rubber compositions according to Examples 1 to 3 and Comparative Examples 1 to 3 were named Preparation Examples 1 to 3 and Comparative Preparation Examples 1 to 3, respectively, and the compositions of each blend are listed in Table 1 below.

TABLE 1

| Classification | Preparation Examples | | | Comparative Preparation Examples | | |
|---|---|---|---|---|---|---|
| | 1 | 2 | 3 | 1 | 2 | 3 |
| Natural rubber | 50 | 50 | 50 | 50 | 50 | 50 |
| Example 1 | 50 | | | | | |
| Example 2 | | 50 | | | | |
| Example 3 | | | 50 | | | |
| Comparative Example 1 | | | | 50 | | |
| Comparative Example 2 | | | | | 50 | |
| Comparative Example 3 | | | | | | 50 |
| Carbon black | 60 | 60 | 60 | 60 | 60 | 60 |
| Zinc oxide | 3 | 3 | 3 | 3 | 3 | 3 |
| Stearic acid | 2 | 2 | 2 | 2 | 2 | 2 |
| Antioxidant | 1.5 | 1.5 | 1.5 | 1.5 | 1.5 | 1.5 |
| Sulfur | 1.5 | 1.5 | 1.5 | 1.5 | 1.5 | 1.5 |
| Vulcanization accelerator | 1.5 | 1.5 | 1.5 | 1.5 | 1.5 | 1.5 |

(Units: Part(s) by weight)

Experimental Examples

1. Mooney Viscosity (CPS)

30 g of each of the blends prepared in Preparation Examples and Comparative Preparation Examples was taken, and pressed using a roller to manufacture two samples with a thickness of 8 mm and an area of 5 cm×5 cm. The two samples were attached to front and rear surfaces of a rotor, and a rotational viscometer (MOONEY MV2000 commercially available from Alpha Technologies) was used. When the rotor was mounted on the rotational viscometer, the rotor was preheated to 100° C. for 1 minute, and then operated to measure a 4-minute change in viscosity of the blend, thereby obtaining a Mooney viscosity expressed by a value of $ML_{1+4}$ (100° C.).

2. Other Physical Properties

Each of the blends according to Preparation Examples and Comparative Preparation Examples was kneaded at 80° C. using a roll mill, processed on a roll with a thickness of 2 mm to form a flat sheet, which was then left for 24 hours. Thereafter, the resulting flat sheet was vulcanized in a press at 160° C. for a crosslinking time measured in a rubber process analyzer (RPA) to prepare a sheet sample with a thickness of 2 mm.

The mechanical/dynamic properties of the sheet sample were measured and compared. The results are listed in Table 2 below. Methods of measurement of the physical properties are as follows.

Hardness: measured according to an ASTM shore-A method.

300% Modulus: obtained by measuring stress applied to a sample when the sample is elongated by 300% at 25° C. (units: $kgf/cm^2$).

Tensile strength: measured according to an ASTM D790 method (units: $kgf/cm^2$)

Elongation: obtained by measuring a strain value (in %) until a sample is broken using a tensile testing machine.

TABLE 2

| Classification | Examples | | | Comparative Examples | | |
|---|---|---|---|---|---|---|
| | 1 | 2 | 3 | 1 | 2 | 3 |
| Mooney viscosity | 87 | 88 | 86 | 60 | 62 | 69 |
| Hardness | 69 | 70 | 69 | 61 | 63 | 65 |
| 300% Modulus | 172.5 | 174.1 | 171.0 | 123.2 | 128.5 | 135.0 |
| Tensile strength | 240.3 | 243.5 | 238.8 | 191.4 | 195.1 | 200.4 |
| Elongation | 420.2 | 415.2 | 423.4 | 430.5 | 428.6 | 425.7 |

Referring to Table 2, it can be seen that Preparation Examples 1 to 3 which included the rubber composition including high-cis 1,4-polybutadiene and syndiotactic 1,2-polybutadiene had remarkably excellent hardness and modulus, compared to Comparative Preparation Example 1, which did not include syndiotactic 1,2-polybutadiene, or Comparative Preparation Examples 2 and 3, which included a smaller amount of syndiotactic 1,2-polybutadiene.

Specifically, the blend of Comparative Example 1 in which no polymerization terminator was used had poor hardness and tensile strength because the syndiotactic 1,2-polybutadiene was not produced, and the blend of Comparative Example 2 in which an alcohol, dibutyl hydroxytoluene, was used as the polymerization terminator had somewhat improved physical strength, compared to Comparative Example 1, because a trace of syndiotactic 1,2-polybutadiene was produced, but an significant increase in the strength was not realized due to a low content of the produced syndiotactic 1,2-polybutadiene.

It can be seen that the blend of Comparative Example 3 in which the phosphorus-based compound, bis(2-ethylhexyl) phosphite, was used as the polymerization terminator as described in Patent Document 1 had improved hardness, modulus and tensile strength, compared to Comparative Example 1, because a predetermined amount of syndiotactic 1,2-polybutadiene was produced, but had poor physical strength, compared to Examples 1 to 3 in which 2-ethylhexanoic acid was used as the polymerization terminator.

According to one aspect of the present invention, a rubber composition in which the syndiotactic conjugated diene-based polymer is dispersed in the high-cis conjugated diene-based polymer can be manufactured.

According to another aspect of the present invention, a rubber composition having a high content of the syndiotactic conjugated diene-based polymer can be manufactured.

According to still another aspect of the present invention, a rubber composition can be manufactured in an in-situ manner in a continuous process, thereby improving productivity and saving production costs.

It should be understood that the effects of the present invention are not limited to the aforementioned effects, and are intended to encompass all effects that can be inferred from the configuration of the present invention disclosed in the detailed description of the present invention or the appended claims.

It should be understood by those skilled in the art to which the present invention belongs that the description of the present invention are given by way of illustration only, and various changes and modifications can be made therein without departing from the spirit and scope of the present invention. Therefore, it should be understood that the aforementioned embodiments are given by way of illustration only, and are not intended to be limiting. For example, respective elements described in an integral form may be realized in a distributed manner, and similarly, and elements that are described as being distributed may be realized in a combined manner.

It should be interpreted that the scope of the present invention is defined by the appended claims, and intended to encompass all modifications and alterations falling within the meaning and the scope of the appended claims, and any equivalents thereof.

What is claimed is:

1. A method of manufacturing a rubber composition, comprising:
   (a) allowing a mixture comprising a conjugated diene-based monomer to react in the presence of a first catalyst;
   (b) introducing a carboxylic acid-based compound into the product of the step (a) to deactivate the first catalyst; and
   (c) introducing a second catalyst and a conjugated diene-based monomer into the product of the step (b) and allowing the second catalyst and the conjugated diene-based monomer to react with the product of the step (b),
   wherein the steps (a) to (c) are carried out in an in-situ manner,
   wherein the first catalyst comprises a lanthanide complex compound, an organoaluminum chloride compound, and an organoaluminum compound,
   wherein the second catalyst comprises a transition metal complex compound, a phosphorus-based compound, and a trialkyl aluminum compound, and
   wherein at least a portion of complex ions of the transition metal complex compound are identical to the carboxylic acid-based compound.

2. The method of claim 1, wherein the carboxylic acid-based compound is represented by Formula 1 below:

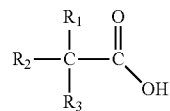

[Formula 1]

wherein each of $R_1$ and $R_2$ is a $C_1$ to $C_{20}$ alkyl group or an aryl group, and
$R_3$ is a $C_1$ to $C_{20}$ alkyl group, an aryl group, or hydrogen.

3. The method of claim 1, wherein the conjugated diene-based monomer comprises one selected from the group consisting of 1,3-butadiene, 2,3-dimethyl-1,3-butadiene, piperylene, 3-butyl-1,3-octadiene, isoprene, 2-phenyl-1,3-butadiene, and a combination of two or more types thereof.

4. The method of claim 1, wherein the organoaluminum chloride compound comprises one selected from the group consisting of diethyl aluminum chloride, dimethyl aluminum chloride, dipropyl aluminum chloride, diisobutyl aluminum chloride, dihexyl aluminum chloride, dioctyl aluminum chloride, ethyl aluminum dichloride, methyl aluminum dichloride, propyl aluminum dichloride, isobutyl aluminum dichloride, hexyl aluminum dichloride, octyl aluminum dichloride, ethyl aluminum sesquichloride, methyl aluminum sesquichloride, propyl aluminum sesquichloride, isobutyl aluminum sesquichloride, hexyl aluminum sesquichloride, octyl aluminum sesquichloride, and a combination of two or more types thereof, and
   the organoaluminum compound comprises one selected from the group consisting of trimethyl aluminum, triethyl aluminum, tripropyl aluminum, tributyl aluminum, triisobutyl aluminum, trihexyl aluminum, diethyl aluminum chloride, diisobutyl aluminum hydride, and a combination of two or more types thereof.

5. The method of claim 1, wherein the phosphorus-based compound comprises a phosphite, a phosphate, or a mixture thereof.

6. The method of claim 1, wherein, in the step (b), a molar ratio of the first catalyst and the carboxylic acid-based compound is in a range of 1:0.5 to 1.5.

7. The method of claim 1, wherein the product of the step (c) has a melting point peak at 160 to 175° C., and
   a heat of fusion of the product at the melting point peak is greater than or equal to 1.0 J/g.

8. The method of claim 1, wherein the rubber composition comprises 60 to 90% by weight of a high-cis conjugated diene-based polymer and 10 to 40% by weight of a syndiotactic conjugated diene-based polymer.

* * * * *